April 8, 1969   NOBORU TSUYA ET AL   3,437,952
OPTICAL MASER OUTPUT CONTROLLING APPARATUS Filed April 6, 1964

NOBORU TSUYA
FUMIO INABA
SEIZO KAINUMA
INVENTOR.

BY ATTORNEY.

AGENT.

3,437,952
OPTICAL MASER OUTPUT CONTROLLING
APPARATUS
Noboru Tsuya, Sendai, Japan (11–S Ridge Road, Greenbelt, Md. 20770); and Fumio Inaba, Apt. 1–22, 68, Kameoka, and Seizo Kainuma, 11–36 Koshiji, Nagamachi, both of Sendai, Japan
Filed Apr. 6, 1964, Ser. No. 357,493
Int. Cl. H01s 1/00; H04b 9/00
U.S. Cl. 331—94.5                1 Claim

ABSTRACT OF THE DISCLOSURE

An electro-acoustic transducer is coupled directly to an optical maser medium for transmitting ultrasonic vibrations thereto. The vibrations are imparted to the crystal either in the axial direction or at right angles to the crystal. Vibration of the crystal during operation thereof as an optical maser causes the output pulses, which are normally irregular in period and intensity to become regular in period and much higher in uniform intensity. This results from the periodic variation of the regeneration of the optical cavity by the ultrasonic vibration.

---

The invention described herein may be manufactured and used by or for the Government of the United States of America for governmental purposes without the payment of any royalties thereon or therefor.

This invention relates to the art of optical masers and more particularly to apparatus for controlling or modulating the output of an optical maser by means of ultrasonic vibration.

Various techniques for modulating and enhancing the peak power of the output of optical masers have been suggested in the literature. These systems generally operate by periodically regulating the regeneration in the optical maser cavity. For example, De Maria et al. describe, in the Journal of Applied Physics, vol. 34, No. 3, March 1963 at page 453, a system using an ultrasonic cell between a ruby rod and an external reflector which cell periodically varies the regeneration of the optical resonant cavity. The ultrasonic vibrations establish a periodic structure in the material of the cell which provides a deflection of the light much like that which would be obtained with an optical grating. The variation of the deflection of the light beam follows that of the ultrasonic vibration, and the resulting output is a series of periodic pulses occurring at twice the ultrasonic frequency. Other ways of modulating the regeneration of optical masers have been suggested, notable among which are the use of a rotating mirror as one of the mirrors of the optical cavity and the insertion of a crystal of ADP between the optical maser medium and one of the reflectors to vary the effective distance between the reflectors. It should be noted that each of the prior systems has at least the disadvantage of requiring an external mirror as one wall of the optical cavity, resulting in difficulties of fabrication.

Accordingly, it is an object of the present invention to provide a method of and apparatus for controlling or modulating the output of a ruby optical maser by means of ultrasonic vibration.

Another object is to provide a controlled optical maser which is relatively simple in construction and economical in operation.

These and other objects are attained by applying ultrasonic vibration to the optical maser medium itself. This is accomplished by connecting the medium to an electro-acoustic transducer so that it may be subjected to the vibrations produced by the transducer. Ultrasonically vibrating the material while it is being activated produces periodic "giant" spikes in the output light as will appear more fully in the detailed description to follow.

Figure 1:
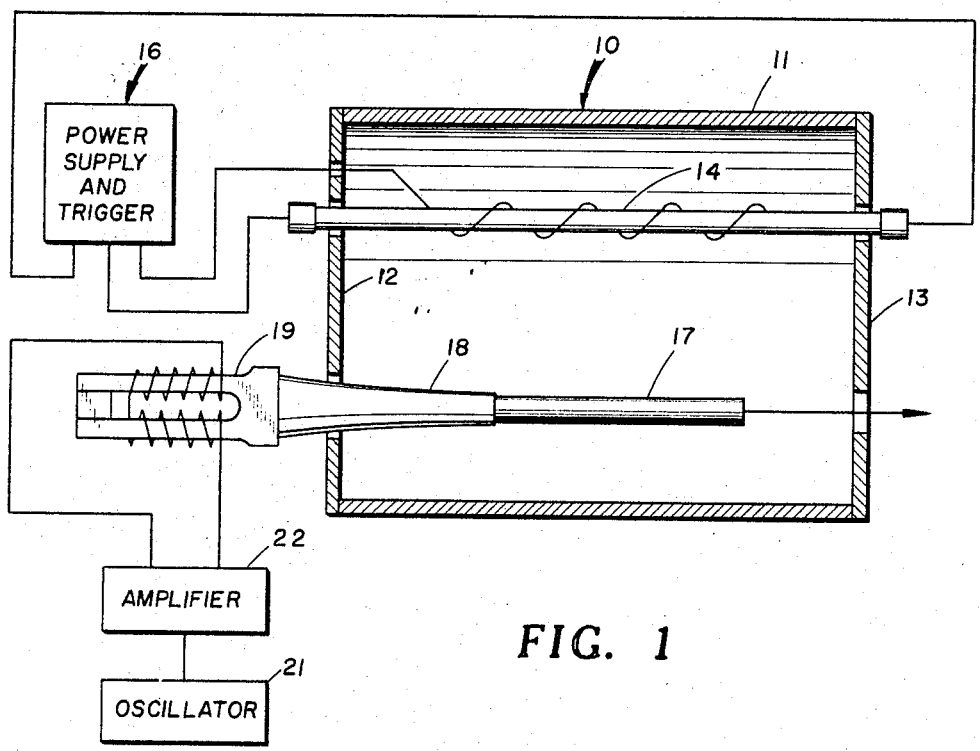
Figure 2:
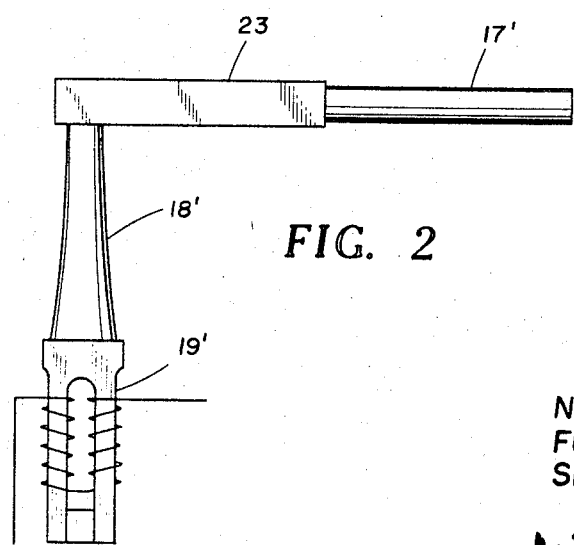

Other objects, advantages and novel features of the invention will become apparent from the following detailed description of the invention was considered in conjunction with the accompanying drawings wherein:

FIG. 1 shows an optical maser system embodying the principles of the invention; and FIG. 2 shows an alternative arrangement for connecting an ultrasonic transducer to an optical maser material.

Referring now to FIG. 1, there is shown for illustrative purposes an optical maser head of a type generally known in the art consisting of an elliptical reflector 11 and supporting end walls 12 and 13. Supported along one focus of the elliptical reflector is a xenon flash lamp 14 which is supplied with power and triggered in conventional manner by means of external circuitry shown generally at 16. A ruby rod 17 having mirrored end faces is supported at the other focus.

In accordance with the present invention, means are provided for imparting ultrasonic vibrations to the body of the optical maser medium, ruby 17 in the case of FIG. 1. The ultrasonic vibrations are transmitted to the ruby rod by a steel exponential connector 18 driven by an electroacoustic transducer 19, which may be for example a ferrite magnetostrictive vibrator. An oscillator 21 and amplifier 22 supply the necessary electrical energy to transducer 19. The FIG. 1 apparatus provides what is here termed a "longitudinal mode of mechanical vibration."

The frequency of oscillation is chosen such that the length of the ruby rod is just half the wavelength of the longitudinal vibration. The output of the optical maser was monitored with a photodetector and it was observed that there occurred only one narrow group of maser pulses per ultrasonic period. Also, the intensity of each group, as shown by the pulse height, was much greater than the intensity of the light from an unvibrated crystal. Increasing the amplitude of the ultrasonic vibration produced no change in the number of pulses per period. The reason for these results is not particularly known. Periodic temperature variations or periodic energy level variations with changes in stress in the medium would theoretically be too small to account for the observations. Perhaps the most natural explanation is that during one cycle there occurs only a single position of sufficiently high Q to cause pulse emission.

FIG. 2 shows an alternative arrangement in which the ruby rod is mounted for what is termed a "transverse mode of vibration." Parts similar to those in the FIG. 1 embodiment are here indicated by primed reference numerals. An optical maser rod 17' is supported at a right angle to the direction of oscillation of a transducer 19' by a rectangular holder 23 which is secured at one end to rod 17' and at its opposite end to exponential horn 18' as shown. Transducer 19', acting through exponential horn 18', drives the left end of holder 23 in the vertical direction as seen in FIG. 2. Because of the inertia of the system, the right end thereof, that is the right end of the ruby rod, will lag behind the oscillations of the left end of the system resulting in a periodic flexure of the ruby rod.

In the practice of the invention in the case of the transverse mode of vibration it appears from the observed results that the output is dependent upon the ultrasonic power imposed on the ruby. At relatively low powers, one group of spikes per ultrasonic period is observed. Upon an increase in ultrasonic power the pattern of spikes changes until they separate into two pulses per ultrasonic period. It would appear that the end mirrors of the ruby rod when it is in the relaxed or unvibrated state are not optically parallel and are periodically driven into parallelism by ultrasonic vibration of sufficient intensity. When optical parallelism occurs the optical maser light is emitted. The conclusion therefore is that in this form of the invention the modulation is produced by a Q-spoiling effect similar to that provided by the rotary mirrors of the prior art. It should be noted that a particular advantage of this method is that it is not necessary to grind the end faces parallel to begin with. This provides a savings in fabrication time and expense. It is sufficient if the surfaces are ground close enough to parallel so that they may be brought into parallelism by the ultrasonic vibration.

It is obvious that many modifications and variations are possible in the light of the above teachings. It is therefore to be understood that within the scope of the appended claim the invention may be practiced otherwise than as specifically described.

What is claimed is:

1. A controlled source of periodic pulses of coherent electromagnetic radiation comprising,
   a ruby rod having mirrored end faces thereon,
   means for inducing stimulated emission in said ruby rod, and
   means physically connected to said rod for imparting vibrations thereto including
      an electroacoustic transducer,
      a connector block,
      an exponential connector secured at its one end to said transducer and at its other end to said connector block,
      said ruby rod being fixed at one end thereof to said connector block and extending at right angles to the direction of vibration of said transducer.

References Cited

UNITED STATES PATENTS

| | | | |
|---|---|---|---|
| 3,247,386 | 4/1966 | Vickery | 332—7.51 |
| 3,256,443 | 6/1966 | Moore | 331—94.5 |

JEWELL H. PEDERSEN, *Primary Examiner.*

R. L. WIBERT, *Assistant Examiner.*

U.S. Cl. X.R.

250—199